United States Patent Office 3,201,441
Patented Aug. 17, 1965

3,201,441
MONO-(AND BIS-)HYDROCARBONTHIOPHOS-PHONOXYHYDROXYALKYL HYDROCAR-BYLAMINES
James M. Petersen, Fishkill, N.Y., Herman D. Kluge, deceased, late of Fishkill, N.Y., by Hazel E. Kluge, administratrix, Fishkill, N.Y., and David D. Reed, Glenham, N.Y., assignors to Texaco Inc., New York, N.Y., a corporation of Delaware
No Drawing. Filed Oct. 18, 1962, Ser. No. 233,180
13 Claims. (Cl. 260—461)

This invention relates to novel reaction products of epoxyalkylhydrocarbylamine and hydrocarbonthiophosphonic acids. More particularly, the subject invention pertains to mono-(or bis-)hydrocarbonthiophosphonoxyhydroxyalkyl hydrocarbylamines, their method of manufacture and lubricant and fuel compositions thereof.

The mono-(or bis-)hydrocarbonthiophosphonoxyhydroxyalkyl hydrocarbylamines of this invention, hereafter known for the sake of brevity as thiophosphonoxy hydrocarbylamines, are represented by the formula:

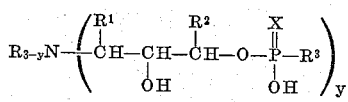

where R is alkyl, aryl, alkaryl or aralkyl of from 1 to 20 carbons, $R^1$ and $R^2$ are hydrogen or alkyl radicals of from 1 to 6 carbons, $R^3$ is hydrocarbyl (monovalent hydrocarbon radical), X is sulfur or a mixture of oxygen and sulfur and $y$ is an integer from 1 to 2, inclusively.

The thiophosphonoxy hydrocarbylamines of this invention are useful as detergent, dispersant and thermal stability additives for lubricating oils and fuels, e.g., mineral oil, synthetic ester oils, and jet fuels.

Broadly, the thiophosphonoxy hydrocarbylamines are prepared by the reaction of epoxyalkylhydrocarbylamine with a hydrocarbonthiophosphonic acid.

PREPARATION OF THE THIOPHOSPHONIC ACID REACTANT

The thiophosphonic acid is prepared by hydrolyzing a hydrocarbon-$P_2S_5$ reaction product. As is known, hydrocarbon-$P_2S_5$ reaction products are formed by the reaction or aromatic hydrocarbons, cycloaliphatic hydrocarbons and aliphatic hydrocarbons with $P_2S_5$ at elevated temperatures. Although a wide variety of hydrocarbons such as aliphatic-substituted aryl compounds and aryl-substituted aliphatic compounds are usable as the hydrocarbon reactant, olefins are generally employed as the hydrocarbon reactant. Lubricating oil fractions constitute another preferred class of materials for reaction with $P_2S_5$ to form a product which after further treatment as outlined below is converted to the thiophosphonic acid. Olefin fractions obtained by cracking of high molecular weight hydrocarbon fractions may also be used as the hydrocarbon reactant.

The olefinic hydrocarbons reacted with $P_2S_5$ usually contain at least 12 carbon atoms although lower molecular weight olefins can be employed. Monoolefin polymers such as isobutylene polymer, butylene polymer, propylene polymer and copolymers of monoolefin such as propylene-isobutylene copolymer are preferred materials for reaction with $P_2S_5$. In general monoolefin polymers and copolymers having an average molecular weight between about 250 and 50,000 are employed with polymers and copolymers having an average molecular weight in the range from 600 to 5,000 being preferred. Copolymers of conjugated dienes and monoolefins such as copolymer of butadiene and isobutylene having an average molecular weight in the above prescribed range also react with $P_2S_5$.

A particular preferred olefin polymer is polybutene having an average molecular weight between 600 and 5,000.

The reaction product obtained by reacting $P_2S_5$ (about 5–40 wt. percent of reaction mass) with a hydrocarbon at a temperature of from about 100–320° C. in an inert atmosphere, for example, under a blanket of nitrogen, is treated at a temperature between about 100 and 260° C. by contact with steam. Steam treatment hydrolyzes the hydrocarbon-$P_2S_5$ reaction product to a hydrocarbonthiophosphonic acid and inorganic phosphorus acids. The hydrocarbonthiophosphonic acid has the general formula:

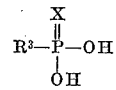

wherein $R^3$ is hydrocarbyl radical derived from the hydrocarbon reacted with $P_2S_5$. $R^3$ is usually an olefinic radical containing 20 to 200 carbon atoms and X is sulfur or a mixture of oxygen and sulfur. X in the above formula is designated as sulfur or a mixture of sulfur and oxygen because the steam hydrolysis step usually results in the replacement of a portion of the sulfur joined to the phosphorous with oxygen.

The inorganic phosphorus acids formed during hydrolysis are removed prior to reaction of the thiophosphonic acid with the epoxyalkylhydrocarbylamine reactant. A number of different procedures are available for removal of the inorganic phosphorus acids. In U.S. Patent Nos. 2,951,835 and 2,987,512, removal of the inorganic phosphorus acids is affected by contact with synthetic hydrous alkali metal silicates and synthetic hydrous alkaline earth metal silicates, respectively. Commonly-assigned, copending application, Serial No. 841,668, filed September 23, 1959 by H. D. Kluge and R. G. Lacoste, now U.S. Patent No. 3,135,729, describes a process wherein inorganic phosphorus acids are removed from the hydrolyzed product by extraction with anhydrous methanol.

EPOXYALKYLHYDROCARBYLAMINE

The epoxyalkylhydrocarbylamine reactant which reacts with the hydrocarbonthiophosphonic acid to form the novel thiophosphonoxy hydrocarbylamines are represented by the general formula:

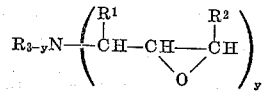

where $R^1$ and $R^2$ are hydrogen or an alkyl of from 1 to 6 carbons, R is hydrocarbyl of from 1 to 20 carbons selected from the group consisting of alkyl, aryl, alkaryl and aralkyl, and $y$ is an integer from 1 to 2, inclusively.

Examples of the epoxyalkylhydrocarbylamines contemplated herein are 2,3-epoxypropyl diethylamine, N,N-bis-(2,3-epoxypropyl)butylamine, N,N-bis(2,3-epoxypropyl)-aniline, N,N - bis(1 - methyl-2,3-epoxybutyl)benzylamine and N,N-bis(2,3-epoxypropyl)tolylamine.

PREPARATION OF THE NOVEL THIOPHOSPHON-OXY HYDROCARBYLAMINE

Reaction of the epoxyalkylhydrocarbylamine with hydrocarbonthiophosphonic acid to produce the thiophosphonoxy hydrocarbylamines of the invention is effected at a temperature between about 25 and 175° C. and at an epoxide to acid reactant mole ratio of between about 0.7:1 and 2:1. Atmospheric, superatmospheric and subatmospheric pressure may be employed with atmospheric pressure being preferred.

LUBRICANTS CONTAINING THE NOVEL THIO-PHOSPHONOXY HYDROCARBYLAMINES

In lubricating oil compositions containing the hydrocarbylamines of the invention, hydrocarbon mineral oil may be employed as base materials such as paraffin base, naphthene base, mixed paraffin base distillate or residual oils. Paraffin base distillate lubricating oil fractions are used in the formulation of premium grade motor oil such as are contemplated in this invention. The lubricating mineral oil base generally has been subjected to solvent refining to improve its lubricity and viscosity-temperature relationship as well as solvent dewaxing to remove waxy components and improve the pour of the oil. Broadly speaking, a mineral lubricating oil having an SUS viscosity at 100° F. between 50 and 1,000 may be used in the formulation of the improved lubricants of this invention. Usually the viscosity range falls between 70 and 300 at 100° F.

The mineral lubricating oils containing the thiophosphonoxy hydrocarbylamines may contain other additives designed to impart other desirable properties thereto. For example, V.I. improvers such as polymethacrylates are normally included therein as are corrosion inhibitors and other detergents.

A widely used V.I. improver is a polymethacrylate of the general formula:

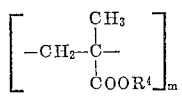

wherein $R^4$ is an aliphatic radical of from 1 to 20 carbons and $m$ is an integer of from 600 to 35,000.

One commonly used supplementary detergent is a alkaline earth metal alkylphenolate. Barium nonylphenolate, barium dedocylcresolate and calcium dedecylphenolate are examples of such detergents. These products are usually present in the lubricating oil in a concentration between 0.1 and 5 wt. percent.

An often used inhibitor and antioxidant is a divalent metal alkyl dithiophosphate resulting from neutralization of a $P_2S_5$-alcohol reactant product with a divalent metal or divalent metal oxide. Barium and zinc alkyl dithiophosphates are the most widely used oxidation and corrosion inhibitors. Metal dialkyl dithiophosphate are usually present in the lubricant in a concentration between 0.1 and 3 wt. percent.

Synthetic lubricating bases of the ester or ether type may be alternatively used as the lubricating base oil. High molecular weight high boiling liquid aliphatic dicarboxylic esters possess excellent viscosity-temperature relationships and lubricating properties and are finding increasing utilization in lubricating oils adapted for high and low temperature lubrication. For example, esters of this type are used in the formulation of jet engine oils.

The thiophosphonoxy hydrocarbylamines are present in lubricating oils in concentrations sufficient to impart dispersant properties thereto. In concentrates used in the formulation of finished lubricants, the concentration of thiophosphonoxy hydrocarbylamine can be as high as 50%. In finished lubricants the concentration of the additives falls between 0.2 and 10 wt. percent with a concentration of between 1 and 5 wt. percent normally employed.

Examples of the thiophosphonoxy hydrocarbylamines contemplated herein are 3-polybutene (940 M.W.) thiophosphonoxy - 2-hydroxypropyldiethylamine; N,N-bis-(3-polybutene (940 M.W.) thiophosphonoxy-2-hydroxypropyl)butylamine; N,N-bis(3-polybutene (940 M.W.) thiophosphonoxy-2-hydroxypropyl)aniline; 3-polybutene (1500 M.W.) thiophosphonoxy-2,3-dimethyl-2-hydroxypropyl ditolylamine and 3-polymethylene (1700 M.W.) thiophosphonoxy-3-ethyl-2-hydroxypropyl dibenzylamine.

Example I below illustrates the preparation of the hydrocarbonthiophosphonic acid from polybutene, $P_2S_5$ and water. Examples II to V illustrates the preparation of the thiophoshonoxy hydrocarbylamine of the invention from the thiophosphonic acid prepared by the method described in Example I. Example VI illustrates lubricant additive properties of the thiophosphonoxy hydrocarbylamines and lubricant compositions containing said additive.

Example I

A polybutene-$P_2S_5$ reaction product was prepared by reacting polybutene having an average molecular weight of about 940 with $P_2S_5$ at a temperature of 232° C., in a mole ratio of polybutene to $P_2S_5$ of 1.1:1 and in the presence of sulfur in an amount equal to 0.5 wt. percent of the polybutene for a period of 4 hours. The reaction product was diluted with approximately 150 wt. percent of a naphthene base oil having an SUS viscosity at 100° F. of 100, steamed at 176° C. for 10 hours in a nitrogen atmosphere and then dried by the passage of nitrogen therethrough at 176° C. The hydrolyzed product was extracted with 50% by volume of methyl alcohol at 55° C. to give a methanol extract containing inorganic phosphorus acids and a lubricating oil raffinate containing olefin-$P_2S_5$ product of the formula:

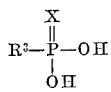

where $R^3$ is a polybutene radical of an average molecular weight of 940 which had a Neut. No. of 22.6. For a thiophosphonic acid of the formula:

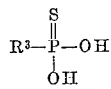

the wt. percent sulfur in said raffinate is theoretically 1.29. The wt. percent sulfur found was 0.51 indicating X in the above formula is a mixture of sulfur and oxygen.

Example II

Polybutene (940 M.W.) thiophosphonic acid prepared as in Example I in the amount of 496 grams (0.2 mole based on neut. No.) was charged to a 1 liter, 3-necked flask equipped with a stirrer, dropping funnel, reflux condenser and a thermometer immersed in the acid. The acid was heated to 93° C. and 39 grams (0.3 mole) of 2,3-epoxypropyl diethylamine was added dropwise to the acid and the stirred reaction mixture was maintained at 93° C. for a period of 2 hours. The final product was stripped with nitrogen of excess epoxide by heating to 93° C. at 1–2 mm. Hg pressure. The residue product was shown by analysis to consist essentially of 3-polybutenethiophosphonoxy-2-hydroxypropyl diethylamine of the formula:

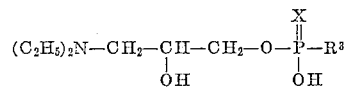

wherein $R^3$ is a radical derived from polybutene having an average molecular weight of 940 and X is a mixture of sulfur and oxygen. This product analyzed as follows:

| Description | Calculated | Found |
| --- | --- | --- |
| Hydroxyl No | 19.3 | 16 |
| Neut. No | 0 | 0.42 |
| Phosphorus, wt. percent | 1.2 | 1.0 |
| Nitrogen, wt. percent | 0.48 | 0.42 |

Example III 248 grams (0.10 mole based on neut No.) of polybutene (940 M.W.) thiophosphonic acid prepared as in Example I was charged to a 1 liter, 3-necked flask equipped with a stirrer, dropping funnel, reflux condenser and a thermometer immersed in the acid. The acid was heated to 93° C. 33 grams (0.15 mole) of 2,3-epoxypropyl diphenylamine was added dropwise to the acid. The reaction with stirring was continued at 93° C. for a 2 hour period whereupon the reaction mixture was stripped with nitrogen of excess epoxyamine reactant by heating to 93° C. at 1–2 mm. Hg pressure. The residual product was shown by analysis to consist essentially of 3-polybutenethiophosphonoxy-2-hydroxypropyl diphenylamine of the formula:

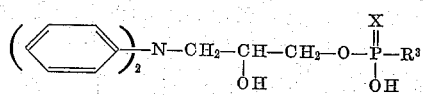

wherein $R^3$ is a radical derived from polybutene having an average molecular weight of about 940 and X is a mixture of sulfur and oxygen. This product analyzed as follows:

| Description | Calculated | Found |
|---|---|---|
| Hydroxyl No | 24.5 | 24 |
| Neut. No | 0 | 1.6 |
| Phosphorus, wt. percent | 1.13 | 0.93 |
| Nitrogen, wt. percent | 0.61 | 0.74 |

*Example IV*

Polybutene (940 M.W.) thiophosphonic acid prepared as in Example I was charged in the amount of 496 grams (0.2 mole based on neut. No.) to a 1 liter, 3-necked flask equipped with a stirrer, reflux condenser and a thermometer immersed in the acid. The acid was heated to 93° C. and 43 grams (0.23 mole) N,N-bis(2,3-epoxypropyl)-butylamine was added dropwise to the acid. The reaction was continued for a period of 2 hours whereupon the reaction mixture was stripped with nitrogen of excess epoxyamine at 93° C. under 1-2 mm. Hg pressure. The residual product was shown by analysis to consist essentially of N,N-bis(3-polybutenethiophosphonoxy-2-hydroxypropyl)butylamine of the formula:

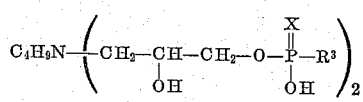

where $R^3$ is a radical derived from polybutene having an average molecular weight of about 940 and X is a mixture of sulfur and oxygen. This product analyzed as follows:

| Description | Calculated | Found |
|---|---|---|
| Hydroxyl No | 25.8 | 37 |
| Neut. No | 0 | 1.2 |
| Phosphorus, wt. percent | 1.23 | 0.94 |
| Nitrogen, wt. percent | 0.65 | 0.59 |

*Example V*

Polybutene (940 M.W.) thiophosphonic acid prepared as in Example I was charged in an amount of 496 grams (0.2 mole) to a 1 liter, 3-necked flask equipped with a stirrer, reflux condenser, dropping funnel and a thermometer immersed in the acid. The acid was heated to 93° C. and 45 grams (0.22 mole) of N,N-bis(2,3-epoxyproyl)-aniline was added dropwise to the acid reactant. The reaction was continued for a period of 2 hours whereupon the excess epoxy compound was stripped from the reaction mixture at a temperature of 93° C. under 1-2 mm. Hg pressure. The residual product was shown by analysis to consist essentially of N,N-bis(3-polybutene (940 M.W.) thiophosphonoxy-2-hydroxypropyl)aniline of the formula:

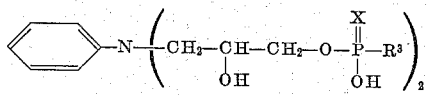

wherein $R^3$ is a polybutene radical having an average molecular weight of about 940 and X is a mixture of sulfur and oxygen. This product analyzed as follows:

| Description | Calculated | Found |
|---|---|---|
| Phosphorus, wt. percent | 1.15 | 1.0 |
| Hydroxyl No | 37.8 | 34 |
| Neut. No | 0 | 2.2 |
| Nitrogen, wt. percent | 0.54 | 0.72 |

*Example VI*

This example illustrates the lubricant compositions of the invention and the outstanding detergent properties of the thiophosphonoxy hydrocarbylamines and lubricant compositions thereof.

In the well known CLR Sludge Engine Test an SAE 10W-30 motor oil containing 3-polybutene (940 M.W.) thiophosphonoxy-2-hydroxypropyl diethylamine of Example II was tested. Oil A is an example of the lubricant of the invention.

Composition: Oil A
| | |
|---|---|
| Refined paraffinic distillate oil, wt. percent (visc. SUS at 100° F.=100) | 90.94 |
| 3-polybutene thiophosphonoxy-2-hydroxypropyl diethylamine | 1.85 |
| Barium $C_{12}$ alkylphenolate, wt. percent | 1.75 |
| Zinc isopropyl methyl isobutyl carbinyl dithiophosphate, wt. percent | 0.88 |
| Mineral oil concentrate containing 25 wt. percent of a copolymer of mixed methacrylate alkyl esters in which the alkyl group range from butyl to octadecyl, wt. percent | 4.00 |
| $CO_2$ neutralized sulfurized basic barium sulfonate (0.08% Ba), wt. percent | 0.58 |
| Dimethylsilicone anti-foam concentrate, p.p.m. | 150 |

Properties Oil A — Results
| | |
|---|---|
| Viscosity (SUS)— | |
| At 100° F. | 307 |
| At 210° F. | 59.5 |
| Viscosity index | 129 |
| Pour point, ° F. | −45 |
| Barium, wt. percent (0.38 calculated) | 0.40 |
| Zinc, wt. percent (0.10 calculated) | 0.11 |

A blank was also tested which was essentially identical to the above formulation except the diethylamine compound was deleted.

The CLR Sludge Engine Test results for the above formulations are as follows:

CLR SLUDGE ENGINE TEST [1]

| Test Time, Hours | Oil A | Blank |
|---|---|---|
| 38 | | 6.9 |
| 54 | 9.5 | 5.4 |
| 70 | 8.6 | |
| 74 | 5.4 | |
| 110 | 5.7 | |

[1] Sludge free oil rating=10.

As can be seen from the above the thiophosphonoxy hydrocarbylamines of the invention substantially inhibit the formation of the sludge in engine oils.

We claim:

1. A thiophosphonoxy hydrocarbylamine of the formula:

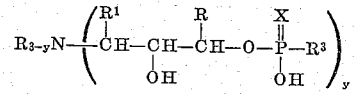

where $R^3$ is a monovalent hydrocarbon derived from an aliphatic polyolefin having an average molecular weight between about 250 and 50,000, X is selected from the group consisting of sulfur and a mixture of sulfur and oxygen, R is selected from the group consisting of alkyl, phenyl, alkylphenyl and phenylalkyl of from 1 to 20 carbons, $R^1$ and $R^2$ are selected from the group consisting of hydrogen and alkyl of from 1 to 6 carbons and y is an integer from 1 to 2, inclusively.

2. A hydrocarbylamine of claim 1 where X is a mixture of sulfur and oxygen and $R^1$ and $R^2$ are hydrogen.

3. 3 - polybutenethiophosphonoxy-2-hydroxypropyl diethylamine of the formula:

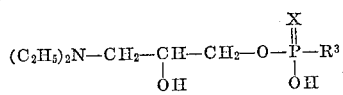

where $R^3$ is polybutene of an average molecular weight of 940 and X is a mixture of sulfur and oxygen.

4. 3 - Polybutenethiophosphonoxy-2-hydropropyl diphenylamine of the formula:

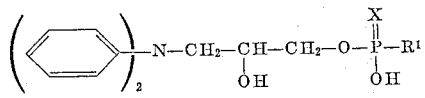

where $R^3$ is polybutene of a molecular weight of about 940 and X is a mixture of sulfur and oxygen.

5. N,N bis (3-polybutenethiophosphonoxy-2-hydroxypropyl) butylamine of the formula:

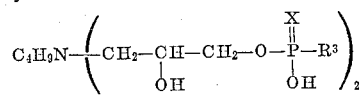

where $R^3$ is polybutene of an average molecular weight of 940 and X is a mixture of sulfur and oxygen.

6. N,N bis (3-polybutenethiophosphonoxy-2-hydroxypropyl) aniline of the formula:

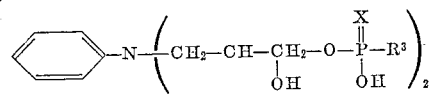

wherein $R^3$ is polybutene of a molecular weight of 940 and X is a mixture of sulfur and oxygen.

7. A process for preparing a thiophosphonoxy hydrocarbylamine of the formula:

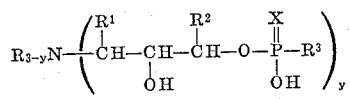

where R is selected from the group consisting of alkyl, phenyl, alkylphenyl and phenylalkyl of from 1 to 20 carbons, $R^1$ and $R^2$ are selected from the group consisting of hydrogen and alkyl of from 1 to 6 carbons, $R^3$ is a monovalent hydrocarbon derived from an aliphatic polyolefin having a molecular weight between about 250 and 50,000, X is selected from the group consisting of sulfur and a mixture of sulfur and oxygen and y is an integer from 1 to 2, inclusively comprising reacting an epoxyamine compound of the formula:

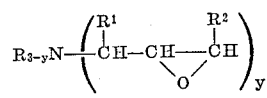

with a thiophosphonic acid of the formula:

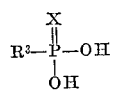

where R, $R^1$, $R^2$ and $R^3$ are as heretofore defined, at a temperature between about 25 and 175° C., at a mole ratio of said amine to said acid of between about 0.7:1 and 2:1.

8. A process in accordance with claim 7 wherein X is a mixture of sulfur and oxygen and $R^1$ and $R^2$ are hydrogen.

9. A process in accordance with claim 7 wherein R is ethyl, $R^1$ and $R^2$ are hydrogen, $R^3$ is polybutene of an average molecular weight of 940, X is a mixture of sulfur and oxygen and y is 1.

10. A process in accordance with claim 7 wherein R is phenyl, $R^1$ and $R^2$ are hydrogen, $R^3$ is polybutene of an average molecular weight of about 940, X is a mixture of sulfur and oxygen and y is 1.

11. A process in accordance with claim 7 where R is butyl, $R^1$ and $R^2$ are hydrogen, $R^3$ is polybutene of an average molecular weight of about 940, X is a mixture of sulfur and oxygen and y is 2.

12. A process in accordance with claim 7 wherein R is penyl, $R^1$ and $R^2$ are hydrogen, $R^3$ is polybutene of an average molecular weight of about 940, X is a mixture of sulfur and oxygen and y is 2.

13. A process for preparing a thiophosphonoxyhydrocarbylamine comprising:
(a) reacting $P_2S_5$ with an aliphatic polyolefin hydrocarbon having an average molecular weight between about 250 and 50,000 at a temperature between about 100 and 320° C. in an inert atmosphere, the $P_2S_5$ constituting between about 5 and 40 wt. percent of the reaction mass,
(b) contacting the resultant $P_2S_5$-aliphatic polyolefin hydrocarbon reaction mass with steam at a temperature between about 100 and 260° C. and removing formed inorganic phosphorus acids from the steam treated reaction mixture,
(c) contacting the resultant inorganic phosphorus acid free, steam treated reaction mixture with an epoxyamine of the formula:

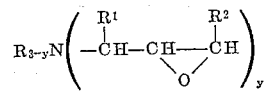

where R is selected from the group consisting of alkyl, phenyl, alkylphenyl and phenylalkyl of from 1 to 20 carbons, and $R^1$ and $R^2$ are selected from the group consisting of hydrogen and alkyl of from 1 to 6 carbons and y is an integer from 1 to 2, at a temperature between about 25 and 175° C. and at a mole ratio of said reaction mixture to said epoxyamine of between about 1:0.7 and 1:2.

References Cited by the Examiner
UNITED STATES PATENTS

| | | | |
|---|---|---|---|
| 2,460,043 | 1/49 | Teeters | 260—461 |
| 2,653,161 | 9/53 | Ballard et al. | 260—461 |
| 3,006,850 | 10/61 | Fields | 252—46.6 |
| 3,071,548 | 1/63 | Gleim et al. | 252—46.6 |

CHARLES B. PARKER, *Primary Examiner.*

IRVING MARCUS, *Examiner.*

UNITED STATES PATENT OFFICE
CERTIFICATE OF CORRECTION

Patent No. 3,201,441

August 17, 1965

James M. Petersen et al.

It is hereby certified that error appears in the above numbered patent requiring correction and that the said Letters Patent should read as corrected below.

column 5, line 53, for "epoxyproyl" read -- epoxypropyl --; column 6, lines 60 to 64, for that portion of the formula reading

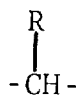    read    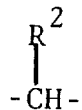

column 7, line 9, for "-hydropropyl" read ---hydroxypropyl --; lines 27 to 30, the formula should appear as shown below instead of as in the patent:

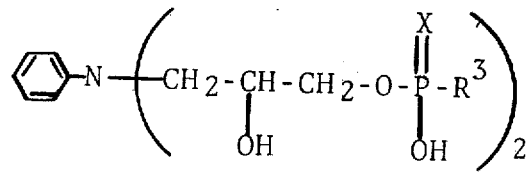

column 8, line 19, for "penyl" read -- phenyl --.

Signed and sealed this 3rd day of May 1966.

(SEAL)
Attest:

ERNEST W. SWIDER
Attesting Officer

EDWARD J. BRENNER
Commissioner of Patents